(12) United States Patent
Shoda et al.

(10) Patent No.: US 12,501,882 B2
(45) Date of Patent: Dec. 23, 2025

(54) CAT CLAW POLISHING AND FILING TOOL

(71) Applicant: NeCoNe Inc., Osaka (JP)

(72) Inventors: Yu Shoda, Osaka (JP); Takahiro Yamada, Osaka (JP)

(73) Assignee: NECONE INC., Osaka (JP)

( * ) Notice: Subject to any disclaimer, the term of this patent is extended or adjusted under 35 U.S.C. 154(b) by 3 days.

(21) Appl. No.: 18/252,451

(22) PCT Filed: Oct. 6, 2021

(86) PCT No.: PCT/JP2021/036937
§ 371 (c)(1),
(2) Date: Jul. 28, 2023

(87) PCT Pub. No.: WO2022/102289
PCT Pub. Date: May 19, 2022

(65) Prior Publication Data
US 2023/0404034 A1    Dec. 21, 2023

(30) Foreign Application Priority Data

Nov. 11, 2020  (JP) ................................. 2020-187820
May 24, 2021   (JP) ................................. 2021-086825

(51) Int. Cl.
*A01K 15/02*    (2006.01)

(52) U.S. Cl.
CPC ................................. *A01K 15/024* (2013.01)

(58) Field of Classification Search
CPC .................................................. A01K 15/024
See application file for complete search history.

(56) References Cited

U.S. PATENT DOCUMENTS 3,486,485 A * 12/1969 Kahanick ............. A01K 15/024
                                                                119/706
4,993,580 A *  2/1991 Smith ...................... B65D 3/22
                                                                220/592.16

(Continued)

FOREIGN PATENT DOCUMENTS

| JP | 2003-333951 A | 11/2003 |
|----|---------------|---------|
| JP | 3112443 U     | 8/2005  |
| JP | 3215623 U     | 4/2018  |

OTHER PUBLICATIONS

International Search Report issued Nov. 22, 2021 in PCT/JP2021/036937 filed on Oct. 6, 2021, 2 pages.

(Continued)

*Primary Examiner* — Monica L Perry
*Assistant Examiner* — Brittany A Lowery
(74) *Attorney, Agent, or Firm* — XSENSUS LLP

(57) ABSTRACT

A cat claw polishing and filing tool includes: a filing member having, on at least one side surface, a filing surface for filing a cat claw; a core having a plurality of corrugated shapes on a side surface; and a liner. An end face of the filing member, an end face of the core having the corrugated shapes, and an end face of the liner are formed on a top surface of the cat claw polishing and filing tool. A space is formed between the filing surface of the filing member and the side surface of the core. The space communicates with the top surface of the cat claw polishing and filing tool, and there is a polishing and filing surface for polishing and filing a cat claw on the top face.

2 Claims, 10 Drawing Sheets

(56) References Cited

U.S. PATENT DOCUMENTS

| | | | | |
|---|---|---|---|---|
| 5,842,440 A * | 12/1998 | Bell, Jr. | ................ | A01K 15/024 |
| | | | | 119/664 |
| 8,561,575 B2 * | 10/2013 | Ruffin | .................. | A01K 15/024 |
| | | | | 119/706 |
| 9,345,233 B1 * | 5/2016 | Tsengas | ................ | A01K 15/024 |
| 10,111,406 B2 * | 10/2018 | Rogers | ..................... | B32B 7/05 |
| 10,609,903 B1 * | 4/2020 | Tsengas | ............... | A01K 15/024 |
| 2004/0139926 A1 * | 7/2004 | Diep | .................... | A01K 15/024 |
| | | | | 119/601 |
| 2006/0042560 A1 * | 3/2006 | Novak | ................. | A01K 15/024 |
| | | | | 119/706 |
| 2010/0122665 A1 * | 5/2010 | Delzio | ................. | A01K 15/024 |
| | | | | 119/706 |
| 2013/0206079 A1 * | 8/2013 | Lipscomb | ............ | A01K 15/024 |
| | | | | 119/706 |
| 2014/0033985 A1 * | 2/2014 | Santiago | .............. | A01K 15/024 |
| | | | | 119/621 |
| 2018/0352785 A1 | 12/2018 | Chia | | |

OTHER PUBLICATIONS

"Fashionable cat scratching" [online], Jan. 27, 2018, Internet: < URL:https ://www.nvanx.net/blog/2018/01/27/003026>, 16 pages (with Machine Generated English Translation).

"Round-shaped nail clipping" [online], Sep. 24, 2016, Internet: < URL: http://junnbichuu.blog83.fc2.com/blog•entry•1772.html>, 4 pages (with Machine Generated English Translation).

* cited by examiner

[Fig. 1]
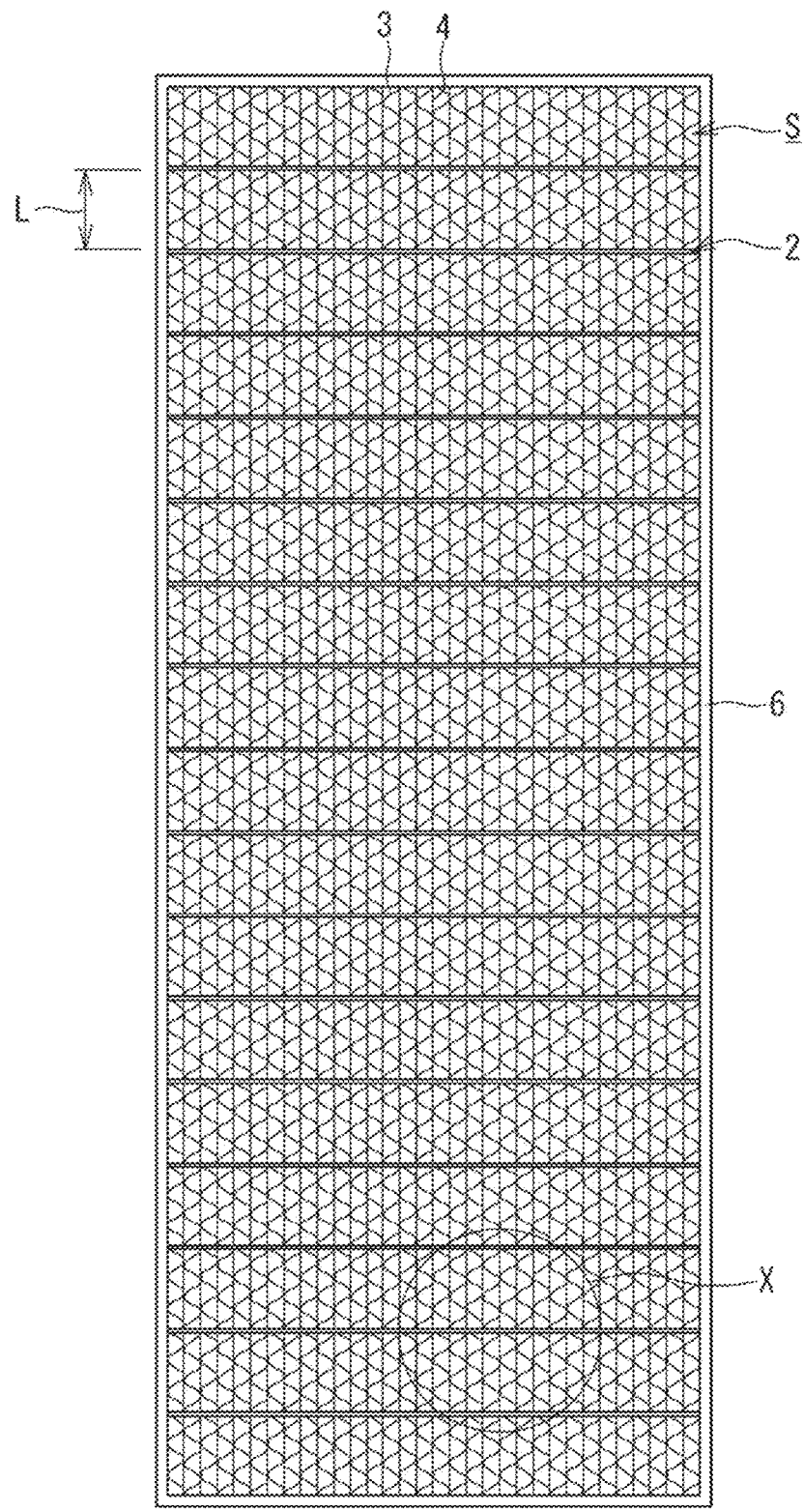

[Fig. 2]
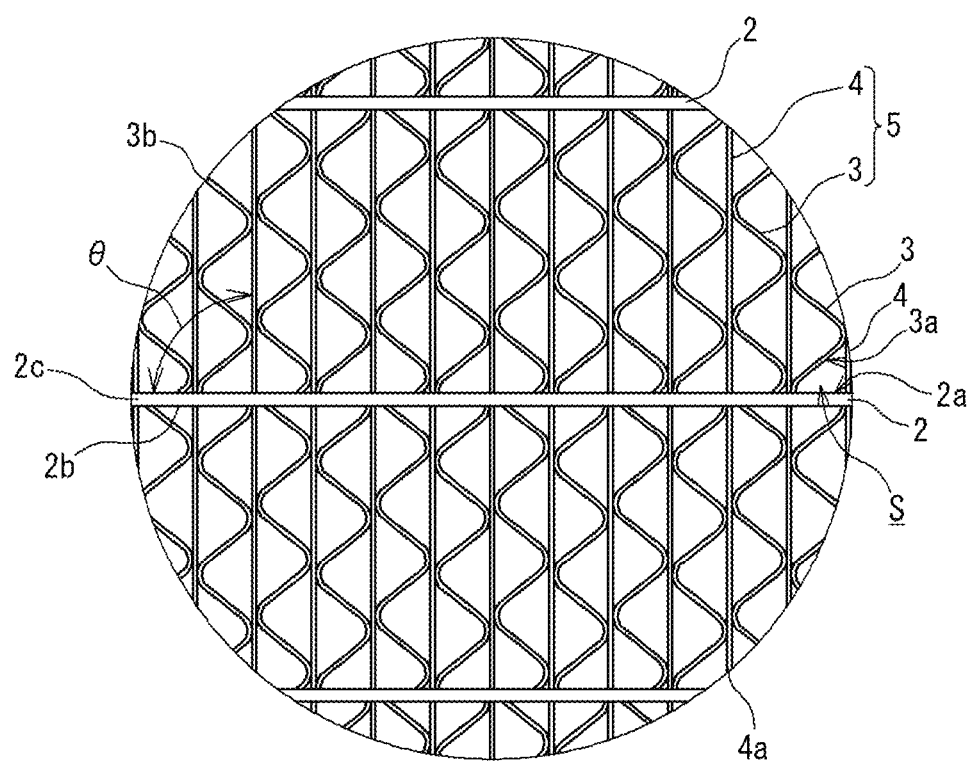

[Fig. 3]
(a)
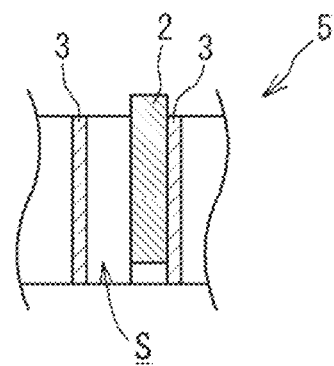
(b)
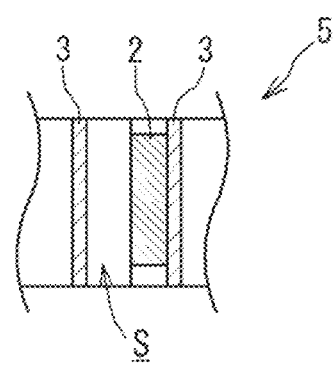
(c)
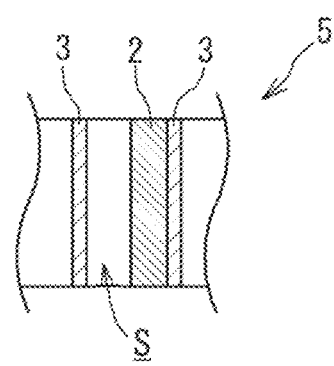

[Fig. 4]
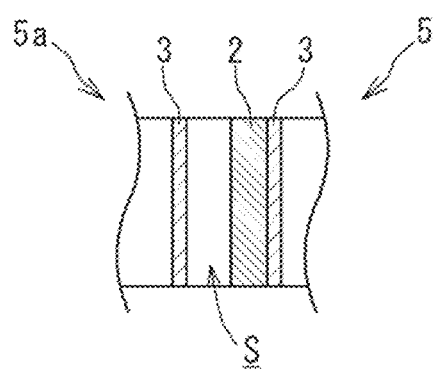

[Fig. 5]
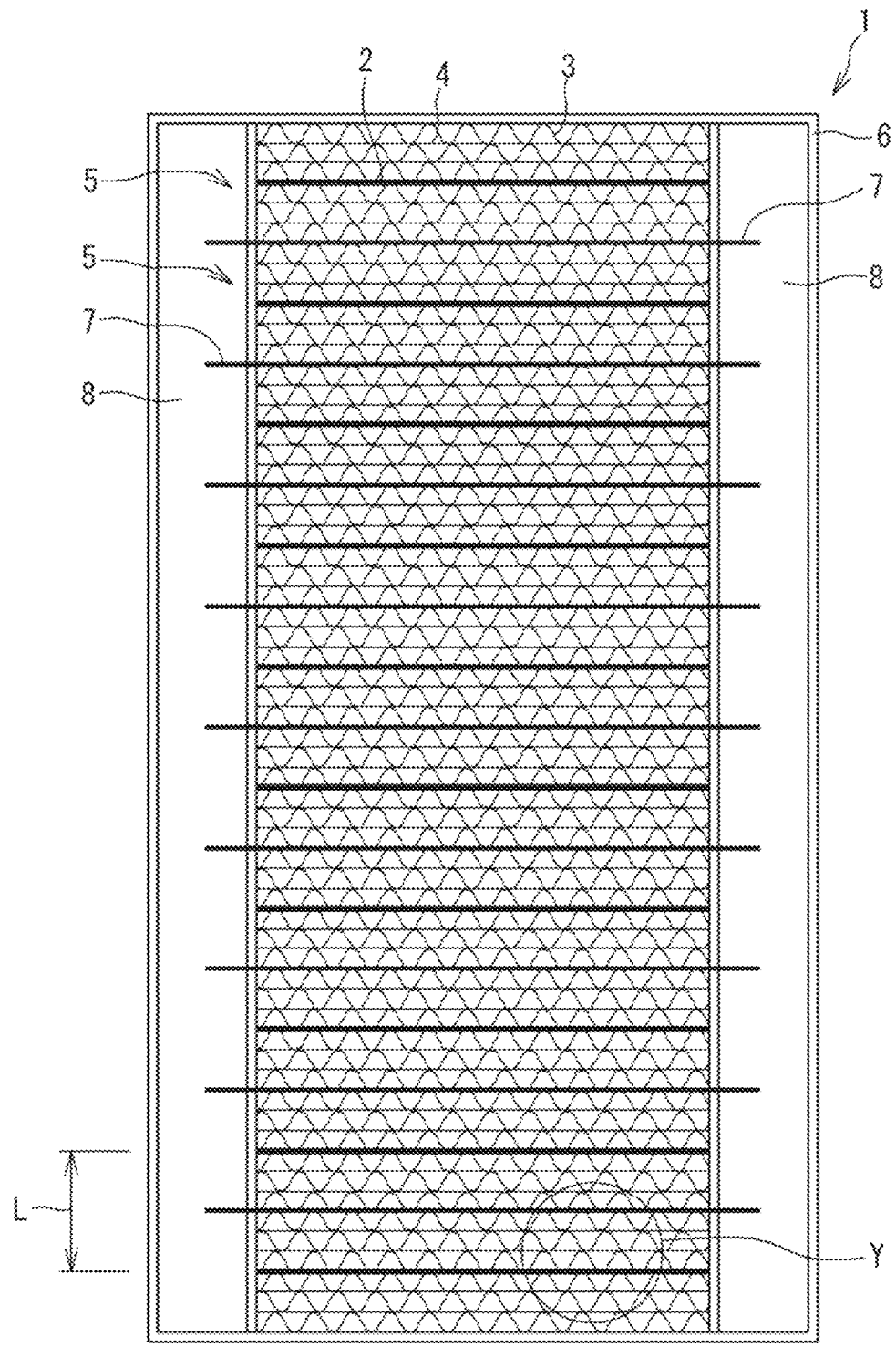

[Fig. 6]
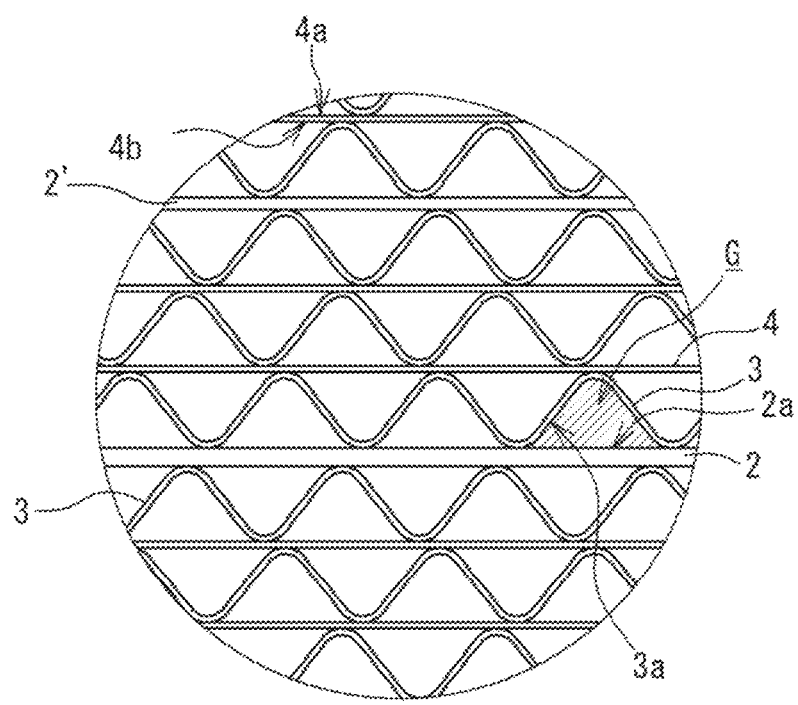

[Fig. 7]
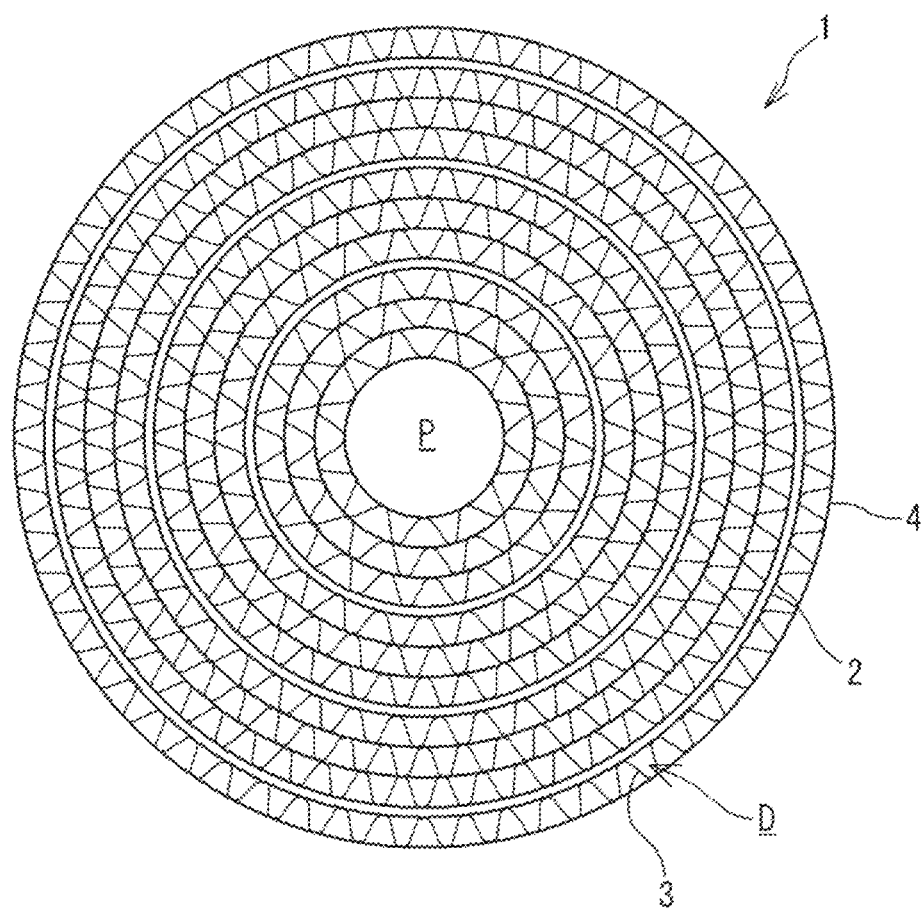

[Fig 8]
(a)
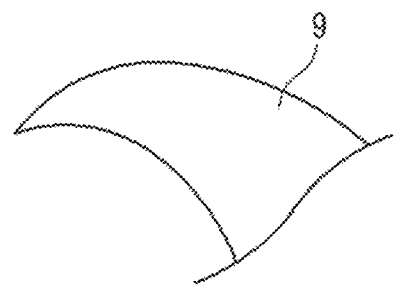
(b)
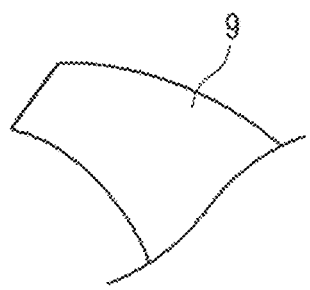

[Fig. 9]
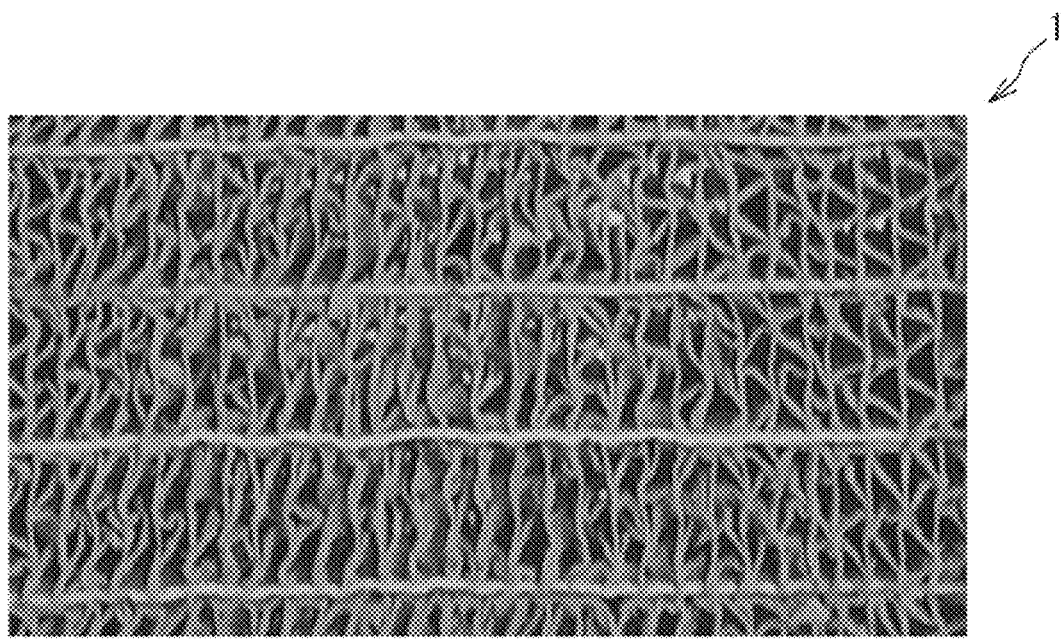

[Fig. 10]
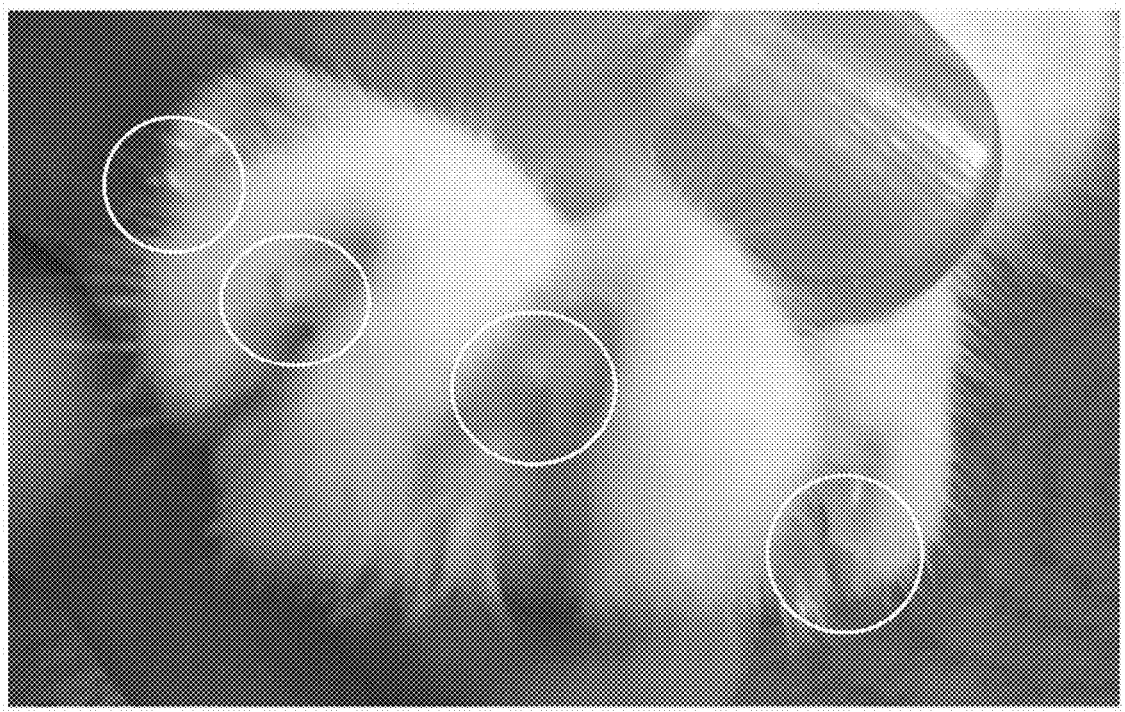

CAT CLAW POLISHING AND FILING TOOL

TECHNICAL FIELD

The present invention relates to a cat claw polishing and filing tool. More specifically, the present invention relates to a cat claw polishing and filing tool, which enables the cat to simultaneously polish and file claws.

BACKGROUND ART

Cats have a behavior of polishing their claws in order to remove an old outer layer from the claws. Polishing a cat claw has been commonly referred to as claw polishing of a cat, claw polishing for a cat or the like. Since claw polishing is a behavior for a cat, the cat claws a wall, a pillar, furniture or the like in a room to polish its claw when the cat is raised in a general household, so that the wall and the like may be damaged by the cat claw.

In recent years, in order to prevent cats from clawing for polishing its claw walls, pillars, furniture and the like in a room, as a claw polishing tool for polishing a cat claw, for example, a claw polishing tool for a cat, provided with a laminated corrugated board formed by laminating and bonding a plurality of corrugated board sheets, a container for detachably housing the laminated corrugated board, and a space for storing paper pieces in the container, wherein a laminated cross section or wavy folds of the laminated corrugated board is used as a polishing area for polishing a claw, and the polishing area is exposed to the outside has been proposed (see, for example, Claim 1 of Patent Literature 1).

When the claw polishing tool for a cat is used for a cat, although a cat claw can be polished, a sharp claw tip of the cat cannot be filed. Therefore, an action of the cat of damaging on walls, pillars, furniture and the like in a room, such clawing walls and the like for polishing a claw of the cat cannot be completely curbed.

Therefore, when the claw polishing tool for a cat is used for a cat, cutting of a cat claw is necessitated in addition to cat claw polishing. However, when a person tries to cut a cat claw forcibly, the cat may scratch, bite or injure the person because the cat habitually dislikes having its claw cut.

In view of the above, as a claw polishing tool which enables to reduce a cat claw by polishing a cat claw, a cat claw polisher with an abrasive, which has a function for enabling to polish a claw, made by coating an abrasive on a back side of a laminated corrugated board or a linen fabric for polishing the cat law to give a substrate, and sandwiching and fixing the substrate between core materials such as wooden plates or laminated corrugated boards has been proposed (see, for example, Claim 1 of Patent Literature 2).

As shown in FIG. 1 and FIG. 2 of Patent Literature 2, the claw polishing tool for a cat is provided with a laminated corrugated board or linen fabric 4, an abrasive material 2, a wooden board or a laminated corrugated board 1, an abrasive 3, and a laminated corrugated board or a linen fabric 5 in this order from the surface of the claw polishing tool. However, the abrasive material 2 built in the claw polishing tool cannot be exposed to the outside unless the cat scratches and tears off the laminated corrugated board or the linen fabric 4, which is a surface layer of the claw polishing tool. Therefore, the cat claw cannot be filed when the cat uses the claw polishing tool in normal use. In addition, even if the cat scratches and tears off the laminated corrugated board or the linen fabric 4, which is a surface layer of the claw polishing tool, and the abrasive material 2 is exposed to the outside, the cat instinctively avoids the claw polishing tool, and would not use the claw polishing tool, because a front leg pad (palm ball) and a claw tip are rubbed by a rough surface of the abrasive material 2.

As another claw polisher for a cat, a cat scratcher including a corrugated cardboard and a grit (sand) layer, wherein the corrugated cardboard and the sand (sand) layer are brought into direct contact has been proposed (for example, Patent Literature 3). Patent Literature 3 discloses in FIG. 3 a cat scratcher including a cardboard layer 25 made of a corrugated sheet 40 and linerboards 30, and a grit layer (sand layer) 100, wherein the grit layer (sand layer) 100 is made by sandwiching grit particles 150 between a pair of backing sheets 110, and wherein the cardboard 25 is brought into direct contact with the grit layer (sand layer) 100. Patent Literature 3 discloses in FIG. 4 to FIG. 8 a cat scratcher including a sandpaper strip 160 made by adhering grit particles 180 to a backing sheet 170, and a pair of linerboards 30, wherein the sandpaper strip 160 is sandwiched between a pair of the linerboards 30, and laminated with the linerboards 30.

According to the cat scratcher shown in FIG. 4, FIG. 7 and FIG. 8 of Patent Literature 3, a cat claw cannot be efficiently filed because a face of the sandpaper strip 160 to which the grit particles 180 are adhered is covered with the backing sheet 110. According to the cat scratcher shown in FIG. 5, cat claw cannot be efficiently filed because a face of the sandpaper strip 160 to which the grit particles 180 are adhered is covered with a seal sheet 190. According to the cat scratcher shown in FIG. 6, a cat claw cannot be efficiently filed because each face of the sandpaper strips 160 to which the grit particles 180 are adhered is laminated with each other.

In view of the above, it can be considered in the cat scratcher that the sandpaper strip 160 is projected from an upper face of the linerboard 30 so that a cat claw can be polished. When the sandpaper strip 160 is projected from the upper face of the linerboard 30, cat leg paws are contacted with the sandpaper strip 160, and the cat dislikes the contact of the leg paws with the sandpaper strip 160. Accordingly, the cat scratcher does not fully demonstrate polishing effects of a cat claw because the cat would not use the cat scratcher.

In addition, it can be also considered in the cat scratcher that the sandpaper strip 160 is laminated with the linerboard 30 so that the sandpaper strip 160 is coplanar with the linerboard 30, and that the sandpaper strip 160 is laminated with the linerboard 30 so that the sandpaper strip 160 is recessed from the upper face of the linerboard 30, in order to prevent cat leg paws from contacting the sandpaper strips 160. However, in either case, a cat claw cannot be efficiently filed because the cat claw is not caught by the sandpaper strip.

Therefore, in recent years, development of a cat claw polishing and filing tool, that allows a cat to polish a cat claw and efficiently file a claw tip has been desired.

PRIOR ART LITERATURES

Patent Literatures

Patent Literature 1: Japanese Unexamined Patent Publication No. 2003-333951
Patent Literature 2: Japanese Utility Model Registration No. 31112443

Patent Literature 3: United States Patent Application Publication No. 2013/0206079

SUMMARY OF THE INVENTION

Problem to be Solved by the Invention

The present invention has been made in view of the above-mentioned prior art. An object of the present invention is to provide a cat claw polishing and filing tool, which enables a cat to polish a claw and efficiently file a claw tip at the same time.

Means for Solving the Problem

The present invention relates to:
(1) a cat claw polishing and filing tool, including a polishing and filing face for polishing and filing a cat claw on its upper face, a filing sheet having a filing face for filing a cat claw on at least one side surface of the filing sheet, a corrugated sheet having a plurality of corrugated shapes on its side surface, and a linerboard, wherein an end face of the filing sheet, an end face having the corrugated shape of the corrugated sheet and an end face of the linerboard are formed on the upper face of the cat claw polishing and filing tool, wherein a space is formed between the filing face of the filing sheet and the side surface of the corrugated sheet, and wherein the space is communicated with the upper face of the cat claw polishing and filing tool;
(2) the cat claw polishing and filing tool according to the above item (1), wherein the claw polishing and filing tool has a laminated corrugated board in which a plurality of the linerboards is alternately laminated with a plurality of the corrugated sheets, and wherein the filing sheet is provided between a plurality of the laminated corrugated boards in a direction orthogonal to the linerboard of the laminated corrugated board;
(3) the cat claw polishing and filing tool according to the above item (1), wherein a plurality of the filing sheets, a plurality of the corrugated sheets and a plurality of the linerboards are laminated in parallel, respectively, wherein the side surface of the linerboard is in contact with the side surface of the corrugated sheet, and wherein the filing face of the filing sheet is in contact with the side surface of the corrugated sheet; and
(4) the cat claw polishing and filing tool according to the above item (1), wherein a plurality of the filing sheets, a plurality of the corrugated sheets and a plurality of the linerboards are concentrically laminated, respectively, wherein the side surface of the linerboard is in contact with the side surface of the corrugated sheet, and wherein the filing face of the filing sheet is in contact with the side surface of the corrugated sheet.

Effects of the Invention

According to the cat claw polishing and filing tool of the present invention, excellent effects such that a cat is capable of efficiently filing a claw tip and polishing a cat claw are exhibited at the same time.

BRIEF DESCRIPTION OF THE DRAWINGS

FIG. 1 is a schematic plan view showing one embodiment of a cat claw polishing and filing tool according to the present invention.

FIG. 2 is a schematic enlarged view of an area surrounded by a circle X shown in the cat claw polishing and filing tool of FIG. 1.

FIG. 3 (a) to (c) are schematic explanatory views of the cat claw polishing and filing tool according to the present invention in a longitudinal section of an area where a filing sheet is inserted in a recess or a through-hole provided on an upper face of the laminated corrugated board, respectively.

FIG. 4 is a schematic explanatory view of the cat claw polishing and filing tool according to the present invention in a longitudinal section of an area where the filing sheet is sandwiched between one laminated corrugated board and another laminated corrugated board.

FIG. 5 is a schematic plan view showing another embodiment of the cat claw polishing and filing tool according to the present invention.

FIG. 6 is a schematic enlarged view of an area surrounded by a circle Y of the cat claw polishing and filing tool according to the present invention shown in FIG. 5.

FIG. 7 is a schematic plan view showing another embodiment of the cat claw polishing and filing tool according to the present invention.

FIG. 8 is a schematic explanatory view showing a claw tip of a forefoot of a cat before and after the use of the cat claw polishing and filing tool according to the present invention.

FIG. 9 is a photograph substituted for a drawing, showing an upper face of the cat claw polishing and filing tool obtained in Example 1 according to the present invention after a cat used the cat claw polishing and filing tool.

FIG. 10 is a photograph substituted for a drawing, showing claw tips of a forefoot of a cat before and after the use of the cat claw polishing and filing tool obtained in Example 1 according to the present invention.

MODE FOR CARRYING OUT THE INVENTION

The cat claw polishing and filing tool according to the present invention is a cat claw polishing and filing tool having a polishing and filing face for polishing and filing a cat claw on its upper face. The cat claw polishing and filing tool includes a filing sheet having a filing face for filing a cat claw on at least one side surface of the filing sheet, a corrugated sheet having a plurality of corrugated shapes on its side surface, and a linerboard, wherein an end face of the filing sheet, an end face having the corrugated shape of the corrugated sheet and an end face of the linerboard are formed on the upper face of the cat claw polishing and filing tool, wherein a space is formed between the filing face of the filing sheet and the side surface of the corrugated sheet, and wherein the space is communicated with the upper face of the cat claw polishing and filing tool.

The cat claw polishing and filing tool according to the present invention utilizes a cat's behavior that a cat scratches a surface having a corrugated shape of a corrugated sheet used in a corrugated board with a claw. When a cat scratches an upper face of the cat claw polishing and filing tool according to the present invention, a cat claw can be polished with an end face of the filing sheet, an end face of the corrugated sheet and an end face of the linerboard each of which is present on the upper face of the cat claw polishing and filing tool, and the cat claw can be filed by the filing face of the filing sheet existing in a space between the filing sheet and the corrugated sheet because the cat claw comes into the space.

Therefore, when a cat uses the cat claw polishing and filing tool according to the present invention, the cat itself polishes its claw, and files its claw tip. Accordingly, conventional complicated operations for cutting a cat claw with a claw clipper, which a cat dislikes, can be eliminated, and therefore, the cat claw polishing and filing tool according to the present invention is very useful for an owner raising a cat.

Incidentally, an upper face of the cat claw polishing and filing tool is a face (polishing and filing face) where a cat polishes and files its claw on the cat claw polishing and filing tool according to the present invention. The polishing and filing a cat claw means polishing of a cat claw and filing of a cat claw.

A polishing face for polishing a cat claw is formed on an upper face of the cat claw polishing and filing tool according to the present invention. The polishing face is formed by an end face of the filing sheet, an end face having a corrugated shape of the corrugated sheet and an end face of the linerboard, which are present on the upper face of the cat claw polishing and filing tool.

The filing sheet has a filing face for filing a cat claw on at least one side surface of the filing sheet. The filing face can be formed on only one side surface of the filing sheet, or on both side surfaces of the filing sheet. It is preferred that the filing face is formed on both side surfaces of the filing sheet from the viewpoint of efficient filing of a cat claw.

The filing face of the filing sheet can be a surface to which an abrasive is adhered, or a surface having ruggedness capable of filing a cat claw.

The filing sheet includes, for example, a filing sheet having a filing face formed by adhering an abrasive to a substrate, a metal file, and the like. It is preferred that the filing sheet is a filing sheet formed by adhering an abrasive to a substrate from the viewpoint of weight reduction of the cat claw polishing and filing tool.

The abrasive used in the filing sheet includes, for example, natural abrasives such as sand, artificial abrasives such as alumina particles and silicon carbide particles, and the like. The present invention is not limited by the kinds of the abrasive. The granularity of the abrasive is defined in JIS R6010.

The substrate used in the filing sheet includes, for example, paper, woven fabrics, nonwoven fabrics, wood plates, resin plates made of a resin such as polyvinyl chloride, polyester, acrylic resin or polypropylene, foamed resin (sponge) plates made of a resin foam such as an acrylic resin foam or a polyurethane foam, plates made of a rubber such as chloroprene rubber or styrene-butadiene rubber, metal plates, and the like. The present invention is not limited only to those exemplified ones.

The filing sheet includes, for example, an abrasive paper (sandpaper) as defined in JIS R6252, in which a sheet of paper is used as a substrate; an abrasive cloth (sand cloth) as defined in JIS R6251, in which a cloth is used as a substrate; a waterproof abrasive paper (waterproof sandpaper) as defined in JIS R6253; a filing sheet made by adhering an abrasive (abrasive particles) to a surface of a substrate such as a wood plate, a resin plate, a foamed resin (sponge) plate, a rubber plate or a metal plate; and the like. The present invention is not limited only to those exemplified ones. The filing sheet is preferably the abrasive paper (sandpaper), the abrasive cloth or the waterproof abrasive paper, and more preferably the abrasive cloth or the waterproof abrasive paper.

When the filing sheet such as the abrasive paper, the abrasive cloth or the waterproof abrasive paper is used as the filing sheet, the filing sheet can be used in a form of, for example, a two-fold filing sheet having an abrasive-adhered surface exposed to the outside; a two-fold filing sheet having an abrasive-adhered surface exposed to the outside, in which inner surfaces of the filing sheet are adhered to each other with a double-sided adhesive tape, an adhesive agent or the like; the two-fold filing sheet having an abrasive-adhered surface exposed to the outside, in which a reinforcing material such as a substrate having elasticity, such as an elastic body made of a sponge or rubber, a resin plate or a corrugated board is sandwiched between the inner surfaces of the filing sheet, and the filing sheet is adhered to the reinforcing material; a filing sheet having a laminated structure made by adhering a filing sheet to one surface or both surfaces of an elastic body made of a sponge or a rubber with a double-sided adhesive tape, an adhesive agent or the like; and the like. It is preferred that the substrate having elasticity, such as a foamed polyethylene is used in the double-sided adhesive tape because a claw tip of the cat can be easily captured by the filing face. The filing sheet having a laminated structure made by adhering a filing sheet to one surface or both surfaces of an elastic body has some advantages such that a claw tip of a cat can be easily captured by the filing face, because the surface of the filing sheet has elasticity based on the substrate having elasticity. It is preferred that the filing sheet has a plate-like shape (plate-like form) from the viewpoint of efficient polishing and filing of a cat claw.

The roughness of the abrasive adhered to the surface of the filing sheet as defined in JIS R6010 is not particularly limited. The roughness is preferably #60 to #1000 or so, more preferably #80 to #600 or so, and furthermore preferably #100 to #240 or so, from the viewpoint of efficient polishing and filing of the cat claws and avoidance of imparting unpleasant feel to a cat.

The filing sheet has the filing face on at least one side surface in order to efficiently polish and file a cat claw by abrading a cat claw with the upper face of the cat claw polishing and filing tool. The filing sheet may also have the filing face on an upper face thereof. The filing face is preferably formed on both side surfaces of the filing sheet, and more preferably formed on an upper face and both side surfaces of the filing sheet, from the viewpoint of efficient polishing and filing of a cat claw even when the cat claw polishing and filing tool is used in an upside-down direction along the plane of the cat claw polishing and filing tool.

It is preferred that the planar shape of the filing sheet is linear in the plane of the cat claw polishing and filing tool from the viewpoint of efficient polishing and filing of a cat claw and avoidance of imparting unpleasant feel to a cat. The linear shape includes, for example, a straight shape, a curved shape, a wavy shape, and the like. The present invention is not limited to the linear shape. It is preferred that the planar shape of the filing sheet is straight from the viewpoint of easiness in production of the claw polishing and filing tool, and efficient polishing and filing of a cat claw. The line width of the linear filing sheet cannot be absolutely determined because the line width depends on kinds of the filing sheet. The line width of the linear filing sheet is preferably 0.5 to 5 mm, more preferably 0.5 to 3 mm, and furthermore preferably 0.8 to 2.5 mm, from the viewpoint of maintaining of mechanical strength of the filing sheet when a cat scratches the upper face of the cat claw polishing and filing tool, efficient polishing and filing of a cat claw, and avoidance of imparting unpleasant feel to a cat. The length of the filing sheet cannot be absolutely determined in the plane of the cat claw polishing and filing tool because the length depends on the shape and size of the cat claw polishing and filing tool, and the like. Therefore, it is preferred that the length is appropriately determined in accordance with the shape and size of the cat claw polishing and filing tool, and the like.

The filing sheet can be formed over an entire width of the cat claw polishing and filing tool, formed on only both ends of the cat claw polishing and filing tool, formed in a central area of the cat claw polishing and filing tool, or formed in a dispersed form on the cat claw polishing and filing tool, and the present invention is not limited to the arrangement of the filing sheet on the cat claw polishing and filing tool. It is preferred that the filing sheet is formed over an entire width or a nearly entire width of the cat claw polishing and filing tool from the viewpoint of efficient polishing and filing of a cat claw.

The cat claw polishing and filing tool according to the present invention has a filing sheet, a corrugated sheet having a plurality of corrugated shapes on its side surface, and a linerboard. It is preferred that the filing sheet, the corrugated sheet and the linerboard are arranged so that each face of the filing sheet, the corrugated sheet and the linerboard is positioned in a direction perpendicular to a planar surface of the cat claw polishing and filing tool.

An end face of the filing sheet, an end face having a corrugated shape of the corrugated sheet and an end face of the linerboard are present on the upper face of the cat claw polishing and filing tool (on the plane surface of the cat claw polishing and filing tool). A space based on the corrugated shape of the corrugated sheet is present between the filing face provided on the side surface of the filing sheet and the side surface of the corrugated sheet, and the space is communicated with the upper face of the cat claw polishing and filing tool. Therefore, when a cat raises a nail, and scratches the upper face of the cat claw polishing and filing tool with a claw, since the claw tip of the cat is caught with the filing sheet, the corrugated sheet and the linerboard, the claw tip of the cat is polished, and since the claw tip of the cat is abraded by the filing face of the filing sheet existing in the space, the claw tip of the cat is filed.

As the linerboard, a linerboard has been commonly used in a corrugated board can be used. The linerboard usually has a planar shape. The linerboard can be curved or have a corrugated shape or the like within a scope which would not hinder an object of the present invention. The filing face can be formed on the side surface of the linerboard by adhering the abrasive to the side surface of the linerboard, or adhering a filing sheet such as an abrasive paper (sandpaper) to the side surface of the linerboard. When the filing face is formed on the side surface of the linerboard, a cat claw can be efficiently filed because the cat claw is abraded with the filing face. The filing face can be provided on one side surface or on both side surfaces of the linerboard. It is preferred that the filing face is formed on both side surfaces of the linerboard from the viewpoint of efficient filing of a cat claw.

As the corrugated sheet, a corrugated sheet which has been generally used in a corrugated board can be used. The corrugated sheet has a plurality of corrugated shapes. The corrugated shape of the corrugated sheet includes, for example, a corrugated shape of the corrugated sheet used in a corrugated board as defined in JIS Z1516 (2003), and the like. The present invention is not limited only to those exemplified ones.

The number of the linerboard and the corrugated sheet cannot be absolutely determined because the number of the linerboard and the corrugated sheet differs depending on the shape and size of the cat claw polishing and filing tool, and the like. Therefore, it is preferred that the number of the linerboard and the corrugated sheet is appropriately determined in accordance with the shape and size of the cat claw polishing and filing tool, and the like.

The filing sheet, the corrugated sheet and the linerboard can be integrated by bonding their contact areas with an adhesive agent.

The face where the end face of the filing sheet, the end face having a corrugated shape of the corrugated sheet and the end face of the linerboard are present is a polishing and filing face of a cat claw. Also, the face where the end face of the filing sheet is not present, and the end face having a corrugated shape of the corrugated sheet and the end face of the linerboard are present is a polishing face of a cat claw.

A face where the end face of the filing sheet, the end face having a corrugated shape of the corrugated sheet and the end face of the linerboard are present (polishing and filing face) can be formed only on the upper face of the cat claw polishing and filing tool, or on both of the upper face and the lower surface of the cat claw polishing and filing tool.

When the face where the end face of the filing sheet, the end face having a corrugated shape of the corrugated sheet and the end face of the linerboard are present (polishing and filing face) is formed only on the upper face of the cat claw polishing and filing tool (on the planar face of the cat claw polishing and filing tool), the lower surface of the cat claw polishing and filing tool (back face of the cat claw polishing and filing tool) can be a face where the end face of the filing sheet is not present, and the end face having a corrugated shape of the corrugated sheet and the end face of the linerboard are present (polishing face), or can be a planar face where any of the end face of the filing sheet, the end face having a corrugated shape of the corrugated sheet and the end face of the linerboard are not present, like a paper face and the like.

When the lower surface of the cat claw polishing and filing tool (back face of the cat claw polishing and filing tool) is a face where the end face of the filing sheet is not present, and the end face having a corrugated shape of the corrugated sheet and the end face of the linerboard are present (polishing face), a cat claw can be polished and filed with the upper face of the cat claw polishing and filing tool (planar face of the cat claw polishing and filing tool), and the cat claw can be polished without filing the cat claw by upsetting the cat claw polishing and filing tool so as to be present the lower face of the cat claw polishing and filing tool (back face of the cat claw polishing and filing tool) on the upper face of the cat claw polishing and filing tool. As described above, when the lower surface of the cat claw polishing and filing tool (back face of the cat claw polishing and filing tool) is a face where the end face of the filing sheet is not present, and the end face having a corrugated shape of the corrugated sheet and the end face of the linerboard are present (polishing face), excessive filing of a cat claw can be prevented by upsetting the cat claw polishing and filing tool so as to be present the lower face of the cat claw polishing and filing tool (back face of the cat claw polishing and filing tool) on the upper face of the cat claw polishing and filing tool, before the cat claw is excessively filed by using the upper face of the cat claw polishing and filing tool (planar face of the cat claw polishing and filing tool).

Accordingly, it is preferred that the upper face of the cat claw polishing and filing tool (planar face of the cat claw polishing and filing tool) is a face where the end face of the filing sheet, the end face having a corrugated shape of the corrugated sheet and the end face of the linerboard are present (polishing and filing face), and that the lower face of the cat claw polishing and filing tool (back side of the cat claw polishing and filing tool) is a face where the end face of the filing sheet is not present, and the end face having a corrugated shape of the corrugated sheet and the end face of the linerboard are present (polishing face) so that a cat claw can be continuously polished by using the cat claw polishing and filing tool according to the present invention after filing the cat claw with the cat claw polishing and filing tool is finished.

In addition, when the end face of the filing sheet, the end face having a corrugated shape of the corrugated sheet and the end face of the linerboard are formed on both of the upper face and the lower face of the cat claw polishing and filing tool, the lower face of the cat claw polishing and filing tool can be used effectively by reversing the upper face and the lower face after being scratched on the upper face by a cat claw, so that the life of the cat claw polishing and filing tool can be extended.

There are individual differences in a direction in which cats scratch the upper face of the cat claw polishing and filing tool. Therefore, it is preferred that the side surface of the filing sheet of the cat claw polishing and filing tool is positioned in a direction that intersects a scratching direction in which a cat scratches the upper surface of the cat claw polishing and filing tool, from the viewpoint of efficient polishing and filing of a cat claw. The direction that intersects a scratching direction in which a cat scratches means a direction perpendicular to the scratching direction in which the cat scratches or a direction slightly inclined to the direction perpendicular to the scratching direction in which a cat scratches.

Thus, the cat claw polishing and filing tool according to the present invention is constructed. The size and shape of the cat claw polishing and filing tool according to the present invention are not particularly limited, and can be appropriately adjusted to a place where the cat claw polishing and filing tool is used, and the like.

The planar shape of the cat claw polishing and filing tool according to the present invention can be rectangular. Alternatively, the planar shape of the cat claw polishing and filing tool may have a shape such as a circle, an oval, a triangle, another polygon or an irregular shape. The three-dimensional shape of the cat claw polishing and filing tool according to the present invention is not particularly limited. The three-dimensional shape of the cat claw polishing and filing tool can be, for example, a standard rectangular parallelepiped shape, a cubic shape, a three-dimensional shape of which cross-sectional shape is a shape of an alphabet, such as an S-shape or a U-shape. Alternatively, the three-dimensional shape can be a shape such as a round column shape, a spherical shape or a conical shape. In addition, the cat claw polishing and filing tool according to the present invention can be installed on a sofa of a cat bed.

Embodiments of the cat claw polishing and filing tool according to the present invention include a rectangular parallelepiped having a length of 20 to 80 cm and a width of 10 to 30 cm, a cylindrical body having a planar shape of a circle and a diameter of the circle of 20 to 80 cm, and the like. The thickness of the cat claw polishing and filing tool is not particularly limited. The thickness of the cat claw polishing and filing tool is, for example, preferably 1 to 10 cm or so, and more preferably 2 to 8 cm or so in consideration of usability and mechanical strength of the cat claw polishing and filing tool.

The cat claw polishing and filing tool according to the present invention can be fitted in a housing case for fixing the cat claw polishing and filing tool. In addition, the cat claw polishing and filing tool according to the present invention can be used by inserting into a cylindrical body. It is preferred that the cylindrical body is provided with a window for exposing the cat claw polishing and filing tool outside on a side surface of a cylindrical body, and that the cylindrical body is provided with an inlet for inserting into or detaching from the cat claw polishing and filing tool at the opening of the cylindrical body. Each of the housing case and the cylindrical body can be made of a corrugated board, a cardboard, a resin such as polypropylene, acrylic resin, polyester, AS resin or ABS resin, wood and the like.

When the cat claw polishing and filing tool according to the present invention is used by fixing in the housing case, the used cat claw polishing and filing tool can be taken out from the housing case and exchanged with a new cat claw polishing and filing tool, and the new cat claw polishing and filing tool can be fixed in the housing case. Therefore, the housing case can be reused.

In addition, the cat claw polishing and filing tool according to the present invention can be divided into a plurality of blocks so that a damaged block of the cat claw polishing and filing tool can be replaced with a new block of the claw polishing and filing tool.

In addition, the cat claw polishing and filing tool according to the present invention can also be used by standing up the cat claw polishing and filing tool in a direction perpendicular to a floor on which the cat claw polishing and filing tool is placed. In this case, the cat claw polishing and filing tool can be provided with an anti-tipping stand at a place where the cat claw polishing and filing tool is contacted with the floor. Alternatively, the cat claw polishing and filing tool can be provided with an attachment means such as an attachment tool for fixing the cat claw polishing and filing tool to a pillar, a wall or the like, such as a hook or a double-sided adhesive tape.

The cat claw polishing and filing tool according to the present invention will be described hereinafter on the basis of drawings. The present invention is not limited only to those embodiments shown in the drawings. The cat claw polishing and filing tool may have embodiments other than the embodiments shown in the drawings within a scope of the present invention.

A first embodiment of the cat claw polishing and filing tool according to the present invention is shown in FIG. 1. FIG. 1 is a schematic plan view showing one embodiment of the cat claw polishing and filing tool 1 according to the present invention. FIG. 2 is a schematic enlarged view of an area surrounded by a circle X shown in the cat claw polishing and filing tool of FIG. 1.

In the first embodiment of the cat claw polishing and filing tool 1 according to the present invention, as shown in FIG. 2, the cat claw polishing and filing tool 1 has a filing sheet 2 having a filing face 2a for filing a cat claw on at least one side surface thereof, a corrugated sheet 3 having a plurality of corrugated shapes on its side surface, and a linerboard 4. An end face of the filing sheet 2, an end face having a corrugated shape of the corrugated sheet 3 and an end face of the linerboard 4 are formed on an upper face of the cat claw polishing and filing tool 1. A space S is formed between the filing face 2a of the filing sheet 2 and a side surface 3a of the corrugated sheet 3, and the space S is communicated with the upper face of the cat claw polishing and filing tool 1.

As shown in FIG. 2, the cat claw polishing and filing tool 1 according the first embodiment has a laminated corrugated board 5 in which a plurality of the corrugated sheets 3 and a plurality of the linerboards 4 are alternately laminated. The filing sheet 2 is provided between a plurality of the laminated corrugated boards 5 in a direction orthogonal to the linerboard 4 of the laminated corrugated board 5. The thickness of the laminated corrugated board 5 is not particularly limited. The thickness of the laminated corrugated board 5 is preferably 1 to 10 cm or so, and more preferably 2 to 8 cm or so, in consideration of usability and mechanical strength of the cat claw polishing and filing tool.

The filing sheet 2 and the laminated corrugated board 5 can be fixed by pressing both of the sheet 2 and the laminated corrugated board 5, or the filing sheet 2 can be integrated with the laminated corrugated board 5 by means of an adhesive means such as an adhesive agent or a double-sided adhesive tape, to prevent the deviation of the filing sheet 2 from the laminated corrugated board 5 when a cat scratches the surface of the cat claw polishing and filing tool 1. When the filing sheet 2 is integrated with the laminated corrugated board 5 by means of an adhesive agent, it is preferred that the adhesive agent is not adhered to an area of the filing sheet 2 where a cat claw is contacted with the filing sheet 2 from the viewpoint of efficient polishing and filing of a cat claw with the filing sheet 2.

As shown in FIG. 2, a plurality of the corrugated sheets 3 and a plurality of the linerboards 4 are alternately laminated adjacent to each other in the laminated corrugated board 5. For example, as to the laminated corrugated board 5 having three layers of the corrugated sheet 3, the corrugated sheet 3 and the linerboard 4 are laminated in the order of the linerboard 4, the corrugated sheet 3, the linerboard 4, the corrugated sheet 3, the linerboard 4, the corrugated sheet 3 and the linerboard 4. An area where the corrugated sheet 3 is contacted with the linerboard 4 can be bonded by means of an adhesive agent in the same manner as commonly used in corrugated boards.

As the laminated corrugated board 5, for example, a corrugated board as defined in JIS Z1516 (2003) can be used. Kinds of the corrugated board mainly include a double-sided corrugated board, a double wall corrugated board and the like, and both of the double-sided corrugated board and the double wall corrugated board can be used in the present invention. Kinds of the corrugated board include, for example, A-flute corrugated board (type: AF), B-flute corrugated board (type: BF) and C-flute corrugated board (type: CF) which are defined in JIS Z1516 (2003), and the like, and the present invention is not limited only to those exemplified ones.

A distance L between the filing sheets 2 shown in FIG. 1, that are adjacent to each other is preferably 10 to 100 mm or so, and more preferably 20 to 5 mm or so, from the viewpoint of efficient polishing and filing of a cat claw and avoidance of imparting unpleasant feel to a cat. The number of the filing sheet 2 provided in the claw polishing and filing tool 1 for a cat cannot be absolutely determined, because the number of the filing sheet 2 depends upon a shape and a size of the cat claw polishing and filing tool 1, and the like. Therefore, it is preferred that the number of the filing sheet 2 is appropriately determined in accordance with the shape and size of the cat claw polishing and filing tool 1, and the like. The number of the filing sheets 2 is preferably 5 or more, more preferably 8 or more, and furthermore preferably 10 or more, from the viewpoint of efficient polishing and filing of a cat claw. An upper limit of the filing sheet 2 cannot be absolutely determined, because the upper limit depends upon the shape and size of the cat claw polishing and filing tool 1, and the like. The upper limit of the filing sheet 2 is usually preferably 100 or less, more preferably 50 or less, and furthermore preferably 30 or less.

As shown in FIG. 1 and FIG. 2, an end part of the filing sheet 2 is provided on the upper face of the cat claw polishing and filing tool 1 so that the end part is exposed on the upper face of the cat claw polishing and filing tool 1. For example, as shown in FIG. 3, a recess (not shown in the figure) can be formed on the upper face of the laminated corrugated board 5, or a through-hole (not shown in the figure) can be formed in the laminated corrugated board 5, and the filing sheet 2 can be inserted in the recess or the through-hole so that the space S is formed between the filing sheet 2 and the corrugated sheet 3. In addition, as shown in FIG. 4, the filing sheet 2 can be sandwiched between the corrugated sheet 3 of the laminated corrugated board 5 and the corrugated sheet 3 of another laminated corrugated board 5a so that the space S is formed.

Incidentally, FIG. 3 is a schematic explanatory view of the cat claw polishing and filing tool 1 according to the present invention in a longitudinal section, in which a recess (not shown in the figure) is formed on the upper face of the laminated corrugated board 5, or a through-hole (not shown in the figure) is formed in the laminated corrugated board 5, and the filing sheet 2 is inserted in the recess or the through-hole so that the space S is formed between the filing sheet 2 and the corrugated sheet 3. FIG. 4 is a schematic explanatory view of the cat claw polishing and filing tool 1 according to the present invention in a longitudinal section, in which the filing sheet 2 is sandwiched between the corrugated sheet 3 of the laminated corrugated board 5 and the corrugated sheet 3 of another laminated corrugated board 5a so that the space S is formed between the corrugated sheet 3 of the laminated corrugated board 5 and the corrugated sheet 3 of another laminated corrugated board 5a.

In FIG. 3, (*a*) is a schematic explanatory view of the cat claw polishing and filing tool 1 in a longitudinal section of the cat claw polishing and filing tool 1 when the filing sheet 2 is projected from the upper face of the cat claw polishing and filing tool 1; (*b*) is a schematic cross-sectional view of the cat claw polishing and filing tool 1 when the file sheet 2 is provided inside from the upper face of the cat claw polishing and filing tool 1; and (*c*) is a schematic explanatory view of the cat claw polishing and filing tool 1 in a longitudinal section of the cat claw polishing and filing tool 1 when the filing sheet 2 is provided so as to be coplanar with the upper face of the cat claw polishing and filing tool 1.

In the present invention, the filing sheet 2 can be projected from the upper face of the cat claw polishing and filing tool 1 as shown in FIG. 3(*a*), can be provided inside from the upper face of the cat claw polishing and filing tool 1 as shown in FIG. 3(*b*), or can be formed so as to be coplanar to the upper face of the cat claw polishing and filing tool 1 as shown in FIG. 3(*c*).

Among the cat claw polishing and filing tools 1 shown in FIG. 3, it is preferred that the filing sheet 2 is provided inside from the upper face or the lower face of the cat claw polishing and filing tool 1 as shown in FIG. 3(*b*), or the filing sheet 2 is formed so as to be coplanar with the upper face of the cat claw polishing and filing tool 1 as shown in FIG. 3(*c*); and it is more preferred that the filing sheet 2 is provided inside from the upper face or the lower face of the cat claw polishing and filing tool 1 as shown in FIG. 3(*b*), from the viewpoint of efficient polishing and filing of a cat claw and avoidance of imparting unpleasant feel to a cat. In the cat claw polishing and filing tool 1 shown in FIG. 3(*b*), the lower face of the filing sheet 2 can be formed so as to be coplanar with the lower face of the cat claw polishing and filing tool 1. In the cat claw polishing and filing tool 1 shown in FIG. 3(c), the filing sheet 2 can be provided inside from the lower face of the cat claw polishing and filing tool 1. Incidentally, in the cat claw polishing and filing tool 1 shown in FIG. 3, the filing face (not shown in the figure) is formed on the side surface of the filing sheet 2.

In the cat claw polishing and filing tool 1 shown in FIG. 3(a), the height of the filing sheet 2, which is protruding from the upper face of the cat claw polishing and filing tool 1 is preferably 0 to 1 mm, and more preferably 0 to 0.5 mm, from the viewpoint of efficient polishing and filing of a cat claw, and avoidance of imparting unpleasant feel to a cat.

In the cat claw polishing and filing tool 1 shown in FIG. 3(b), the depth from the upper face of the cat claw polishing and filing tool 1 to a position where the filing face of the filing sheet 2 is present is preferably 8 mm or less, more preferably 5 mm or less, and furthermore preferably 3 mm or less, from the viewpoint of efficient polishing and filing of a cat claw. In addition, the depth from the upper face of the cat claw polishing and filing tool 1 to the position where the filing face of the filing sheet 2 is present is preferably 1 mm or more, and more preferably 2 mm or more, from the viewpoint of inhibition of excessive filing of a cat claw.

In the cat claw polishing and filing tool 1 shown in FIG. 4, the filing sheet 2 is sandwiched between the corrugated sheet 3 of the laminated corrugated board 5 and the corrugated sheet 3 of another laminated corrugated board 5a so that the space S is formed. The space S between the filing face (not shown in the figure) which is present on the side surface of the filing sheet 2 and the side surface of the corrugated sheet 3 is formed by the filing face of the filing sheet 2 and the corrugated shape of the side surface of the corrugated sheet 3.

In the cat claw polishing and filing tool 1 shown in FIG. 4, it is preferred that a recess (not shown in the figure) is formed on the upper face of the laminated corrugated board 5, or a through-hole (not shown in the figure) is formed in the laminated corrugated board 5, and that the filing sheet 2 is inserted in the recess or the through-hole so that the space S is formed between the filing sheet 2 and the corrugated sheet 3; and it is more preferred that the recess is formed on the upper face of the laminated corrugated board 5, and that the filing sheet 2 is inserted in the recess so that the space S is formed between the filing sheet 2 and the corrugated sheet 3, as well as the cat claw polishing and filing tool 1 shown in FIG. 3. In this case, the depth of the recess is not particularly limited. The depth of the recess is preferably 20% to 60% or so of the thickness of the laminated corrugated board 5 from the viewpoint of firm fixing of the filing sheet 2 in the recess and maintaining of mechanical strength of the laminated corrugated board 5.

In the cat claw polishing and filing tool 1 shown in FIG. 4, the upper face and the lower face of the filing sheet 2 are on the same plane surface of the upper face and the lower face of the cat claw polishing and filing tool 1, respectively. The upper face and the lower face of the filing sheet 2 can be projected from the upper face and the lower face of the cat claw polishing and filing tool 1, respectively. Alternatively, the upper face and the lower face of the filing sheet 2 can be provided inside from the upper face and the lower face of the cat claw polishing and filing tool 1, respectively. It is preferred that the filing sheet 2 is formed so as to be coplanar with the upper face of the cat claw polishing and filing tool 1, or that the filing sheet 2 is provided inside from the upper face of the cat claw polishing and filing tool 1, from the viewpoint of efficient polishing and filing of a cat claw, and avoidance of imparting unpleasant feel to a cat. In the cat claw polishing and filing tool 1 shown in FIG. 4, the filing face (not shown in the figure) is formed on the side surface of the filing sheet 2.

In the cat claw polishing and filing tool 1 shown in FIG. 4, when the filing sheet 2 is projected from the upper face of the cat claw polishing and filing tool 1, the height of the filing sheet 2 projected from the upper face of the cat claw polishing and filing tool 1 is preferably 0 to 1 mm or so, and more preferably 0 to 0.5 mm or so, from the viewpoint of efficient polishing and filing of a cat claw, and avoidance of imparting unpleasant feel to a cat.

In the cat claw polishing and filing tool 1 shown in FIG. 4, when the filing sheet 2 is present inside from the upper face of the cat claw polishing and filing tool 1, the depth from the upper face of the cat claw polishing and filing tool 1 to a position where the filing face of the filing sheet 2 is present is preferably 8 mm or less, more preferably 5 mm or less, and furthermore preferably 3 mm or less, from the viewpoint of efficient polishing and filing of a cat claw. In addition, the depth from the upper face of the cat claw polishing and filing tool 1 to the position where the filing face of the filing sheet 2 is present is also preferably 1 mm or more, and more preferably 2 mm or more, from the viewpoint of inhibiting of excessive filing of a cat claw.

It is preferred that the filing sheet 2 is sandwiched between the corrugated sheet 3 of the laminated corrugated board 5 and the corrugated sheet 3 of another laminated corrugated board 5a as shown in FIG. 4, from the viewpoint of increase in production efficiency of the cat claw polishing and filing tool 1. It is also preferred that a platy (plate-like) filing sheet is used as the filing sheet 2, and that the filing sheet 2 is positioned in a direction perpendicular to a planar surface of the cat claw polishing and filing tool 1 as shown in FIG. 3 and FIG. 4, from the viewpoint of efficient polishing and filing of a cat claw.

The filing sheet 2 can be bonded to the laminated corrugated board 5, for example, by applying an adhesive agent to an inner face of the recess or an inner face of the through-hole of the laminated corrugated board 5, or applying an adhesive agent to the filing sheet 2, and thereafter inserting the filing sheet 2 to the recess or the through-hole. Alternatively, the side surface of the corrugated sheet 3 can be bonded to the side surface of the filing sheet 2, for example, by using a plurality of the laminated corrugated boards 5, applying an adhesive agent to an area where the side surface of the corrugated sheet 3 of the laminated corrugated board 5 is contacted with the side surface of the filing sheet 2, and laminating the corrugated sheet 3 with the filing sheet 2.

In the upper face of the cat claw polishing and filing tool 1 shown in FIG. 1 and FIG. 2, the corrugated sheet 3 and the linerboard 4 are arranged in parallel, and the filing sheet 2 and the linerboard 4 are arranged in an orthogonal direction. As shown in FIG. 2, the space S is formed between the filing face 2a of the filing sheet 2 and the side surface 3a of the corrugated sheet 3, and the space S is communicated with the upper face of the cat claw polishing and filing tool 1. Therefore, when a cat scratches the upper face of the cat claw polishing and filing tool 1 with its paw, since a claw of the cat's paw enter the space S, and the claw is abraded with the filing face 2a of the filing sheet 2 present in the space S, the cat claw can be filed efficiently.

In the cat claw polishing and filing tool 1, the filing sheet 2 and the linerboard 4 are provided in an orthogonal direction. An angle θ between the filing sheet 2 and the linerboard 4 shown in FIG. 2 is ideally a right angle (90°). However, the angle θ is not necessarily a right angle. The angle θ is preferably 45° to 90°, more preferably 60° to 90°, and furthermore preferably 90°.

In the cat claw polishing and filing tool 1 shown in FIG. 1, the cat claw polishing and filing tool 1 is used by fixing in a housing case 6.

A second embodiment of the cat claw polishing and filing tool according to the present invention is shown in FIG. 5. FIG. 5 is a schematic plan view showing another embodiment of the cat claw polishing and filing tool according to the present invention. FIG. 6 is a schematic enlarged view of an area surrounded by a circle Y of the cat claw polishing and filing tool according to the present invention shown in FIG. 5.

As shown in FIG. 5 and FIG. 6, the cat claw polishing and filing tool 1 has the filing sheet 2 having a filing face for filing a cat claw on a side surface, the corrugated sheet 3 having a corrugated shape, and the linerboard 4 having a flat plate shape. The end face of the filing sheet 2, the end face of the corrugated sheet 3 having a corrugated shape and the end face of the linerboard 4 are formed on the upper face of the cat claw polishing and filing tool 1 (planar surface of the cat claw polishing and filing tool 1).

A plurality of the filing sheets 2, a plurality of the corrugated sheets 3 and a plurality of the linerboards 4 are laminated in parallel, respectively. The side surface of the linerboard 4 is in contact with the side surface of the corrugated sheet 3, and the side surface of the filing sheet 2 is in contact with the side surface of the corrugated sheet 3. It is preferred that both side surfaces of the filing sheet 2 are in contact with the side surface of the corrugated sheet 3. As shown in FIG. 6, a space G is formed between the filing face 2a of the filing sheet 2 and the side surface 3a of the corrugated sheet 3. The space G is communicated with the upper face of the cat claw polishing and filing tool 1.

The corrugated sheet 3 and the linerboard 4 are laminated to form a laminate. The laminated corrugated board 5 mentioned above can be used in the laminate of the corrugated sheet 3 and the linerboard 4. The laminated corrugated board 5 is formed by alternately laminating a plurality of the corrugated sheets 3 and a plurality of the linerboards 4 adjacent to each other. It is preferred that the constitution of the laminated corrugated board 5 is the same as mentioned above.

A distance L between the filing sheets 2 shown in FIG. 5, that are adjacent to each other is, preferably 10 to 100 mm or so, and more preferably 20 to 50 mm or so, from the viewpoint efficient polishing and filing of a cat claw, and avoidance of imparting unpleasant feel to a cat. The number of the filing sheet 2 provided in the cat claw polishing and filing tool 1 cannot be absolutely determined because the number of the filing sheet 2 depends upon the shape and size of the cat claw polishing and filing tool 1, and the like. Accordingly, it is preferred that the number of the filing sheet 2 is appropriately determined in accordance with the shape and size of the cat claw polishing and filing tool 1, and the like. The number of filing sheets 2 is preferably 5 or more, more preferably 8 or more, and furthermore preferably 10 or more, from the viewpoint of efficient polishing and filing of a cat claw. An upper limit of the number of the filing sheet 2 cannot be absolutely determined because the upper limit of the number of the filing sheet 2 depends upon the shape and size of the cat claw polishing and filing tool 1, and the like. The upper limit of the number of the filing sheet 2 is usually preferably 100 or less, more preferably 50 or less, and furthermore preferably 30 or less.

An end part of the filing sheet 2 is provided so that the end part of the filing sheet 2 is exposed on the upper face of the cat claw polishing and filing tool 1. A recess (not shown in the figure) or a through-hole (not shown in the figure) can be formed on the upper face of the laminated corrugated board 5, and the filing sheet 2 can be inserted in the recess or the through-hole as shown in FIG. 3. Alternatively, the filing sheet 2 can be sandwiched between the corrugated sheet 3 of the laminated corrugated board 5 and the corrugated sheet 3 of another laminated corrugated board 5a as shown in FIG. 4. When the filing sheet 2 is sandwiched between the corrugated sheet 3 of the laminated corrugated board 5 and the corrugated sheet 3 of another laminated corrugated board 5a, the space S is formed between the filing face formed on the side surface of the filing sheet 2 and the side surface having a corrugated shape of the corrugated sheet 3 as shown in FIG. 4.

It is preferred that a recess or a through-hole is formed on the upper face of the laminated corrugated board 5, and that the filing sheet 2 is inserted to the recess or through-hole from the viewpoint of increase in mechanical strength of the laminated corrugated board 5. It is preferred that the filing sheet 2 is sandwiched between the corrugated sheet 3 of the laminated corrugated board 5 and the corrugated sheet 3 of another laminated corrugated board 5a as shown in FIG. 4 from the viewpoint of increase in production efficiency of the cat claw polishing and filing tool 1. It is also preferred that a platy (plate-like) filing sheet is used as the filing sheet 2, and that the filing sheet 2 is arranged in a direction perpendicular to a planar surface of the cat claw polishing and filing tool 1 as shown in FIG. 3 and FIG. 4 from the viewpoint of efficient polishing and filing of a cat claw.

The filing sheet 2 can be bonded to the laminated corrugated board 5, for example, by applying an adhesive agent to an inner face of a recess or an inner face of the through-hole of the laminated corrugated board 5, or applying an adhesive agent to the filing sheet 2, and thereafter inserting the filing sheet 2 into the recess or the through-hole, or by using a plurality of the laminated corrugated boards 5, applying an adhesive agent to an interface of the laminated corrugated board 5 and the filing sheet 2, and laminating the laminated corrugated board 5 with the filing sheet 2.

It is preferred that the filing sheet 2 is the same as the embodiments of the filing sheet 2 shown in FIG. 3 and FIG. 4 described above.

In the cat claw polishing and filing tool 1 shown in FIG. 5 and FIG. 6, a plurality of the filing sheets 2, a plurality of the corrugated sheets 3 and a plurality of the linerboards 4 are laminated in parallel, respectively. In the cat claw polishing and filing tool 1 shown in FIG. 6, the space G is formed between the filing face 2a of the filing sheet 2 and the side surface 3a of the corrugated sheet 3, and the space G is communicated with the upper face of the cat claw polishing and filing tool 1. Therefore, when a cat scratches the upper face of the cat claw polishing and filing tool 1 with a paw, since a claw of the cat's paw enters the space G, and the cat claw is abraded and filed with the filing face 2a of the filing sheet 2 which is present in the space G, the cat claw can be filed efficiently. As shown in FIG. 6, the width of the filing sheet 2 is different from the width of the filing sheet 2'. However, the width of the filing sheet 2 can be the same as or different from the width of the filing sheet 2'.

In the cat claw polishing and filing tool 1, the filing sheet 2, the corrugated sheet 3 and the linerboard 4 are laminated in parallel, respectively. However, the filing sheet 2, the corrugated sheet 3 and the linerboard 4 can be laminated so that each of the filing sheet 2, the corrugated sheet 3 and the linerboard 4 has a slanted angle, respectively within a scope which would not hinder an object of the present invention.

The cat claw polishing and filing tool 1 shown in FIG. 5 is used by fixing in a housing case 6. In the cat claw polishing and filing tool 1 according to the present invention, and a damaged laminated corrugated board 5 can be replaced with a new laminated corrugated board 5 by preparing a plurality of the laminated corrugated boards 5. In this case, as shown in FIG. 5, the cat claw polishing and filing tool 1 according to the present invention can be fixed, for example, by providing a mounting flange 7 at an end part of the laminated corrugated board 5, inserting the mounting flange 7 into a fixing member 8 arranged in the housing case 6, to fix the fixing member 8 in the housing case 6. The fixing member 8 includes, for example, an elastic material made of a rubber, a sponge, an elastomer or the like, or a molded article made of a resin such as polypropylene, polyvinyl chloride, AS resin or ABS resin, and the like, and the present invention is not limited only to those exemplified ones.

In addition, the filing sheet 2 of the cat claw polishing and filing tool 1 can be used as the mounting flange 7. When the filing sheet 2 of the cat claw polishing and filing tool 1 is used as the mounting flange 7, a new filing sheet 2 can be replaced with a damaged filing sheet 2 of the cat claw polishing and filing tool 1 by taking out the damaged filing sheet 2 from the fixing member 8.

A third embodiment of the cat claw polishing and filing tool according to the present invention is shown in FIG. 7. In the third embodiment of the cat claw polishing and filing tool 1 according to the present invention, a plurality of the filing sheets 2, a plurality of the corrugated sheets 3 and a plurality of the linerboards 4 are concentrically laminated, respectively. The side surface of the linerboard 4 is in contact with the side surface of the corrugated sheet 3, and the side of the filing sheet 2 is in contact with the side surface of the corrugated sheet 3. A space D is formed between the filing face of the filing sheet 2 and the side surface of the corrugated sheet 3, and the space D is communicated with the upper face of the cat claw polishing and filing tool 1.

The third embodiment of the cat claw polishing and filing tool 1 is different from the second embodiment of the cat claw polishing and filing tool 1 at the point that a plurality of the filing sheets 2, a plurality of the corrugated sheets 3 and a plurality of the linerboards 4 are concentrically laminated in the third embodiment of the cat claw polishing and filing tool 1 in, whereas a plurality of the filing sheets 2, a plurality of the corrugated sheets 3 and a plurality of the linerboards 4 are laminated in parallel in the second embodiment of the cat claw polishing and filing tool 1.

It is preferred that the third embodiment of the cat claw polishing and filing tool 1 is the same as the second embodiment of the cat claw polishing and filing tool 1, except that a plurality of the filing sheets 2, a plurality of the corrugated sheets 3 and a plurality of the linerboards 4 are concentrically laminated in the third embodiment of the cat claw polishing and filing tool in the second embodiment, as compared to the second embodiment of the cat claw polishing and filing tool.

In the third embodiment of the cat claw polishing and filing tool, a plurality of the filing sheets 2, a plurality of the corrugated sheets 3 and a plurality of the linerboards 4 can be integrated with an adhesive agent.

The laminated corrugated board 5 mentioned in the above can be used in the laminate of the corrugated sheet 3 and the linerboard 4. The laminated corrugated board 5 is formed by alternately laminating a plurality of the corrugated sheets 3 and a plurality of the linerboards 4 adjacent to each other. It is preferred that the constitution of the laminated corrugated board 5 is the same as mentioned above.

The filing sheet 2, the corrugated sheet 3 and the linerboard 4 of the cat claw polishing and filing tool 1 are arranged concentrically. However, the filing sheet 2, the corrugated sheet 3 and the linerboard 4 are not necessarily completely concentric, and can be distorted respectively within a scope which would not hinder an object of the invention.

It is preferred that a distance between the filing sheets 2 that are adjacent to each other is the same as the distance L between the filing sheets 2 shown in FIG. 1, that are adjacent to each other of the cat claw polishing and filing tool 1. The number of the filing sheet 2 provided in the cat claw polishing and filing tool 1 cannot be absolutely determined because the number of the filing sheet 2 depends on the size of the cat claw polishing and filing tool 1, and the like. Accordingly, it is preferred that the number of the filing sheet 2 is appropriately determined in accordance with the size of the cat claw polishing and filing tool, and the like. The number of the filing sheet 2 is preferably 5 or more, more preferably 8 or more, and furthermore preferably 10 or more, from the viewpoint of efficient polishing and filing of a cat claw. An upper limit of the number of the filing sheet 2 cannot be absolutely determined because the number of the filing sheet 2 depends on the size of the cat claw polishing and filing tool 1, and the like. The upper limit of the number of the filing sheet 2 is usually preferably 100 or less, more preferably 50 or less, and furthermore preferably 30 or less.

The filing sheet 2 can be projected from the upper face of the cat claw polishing and filing tool 1, can be present inside from the upper face of the cat claw polishing and filing tool 1, or can be formed so as to be coplanar with the upper face of the cat claw polishing and filing tool 1, as well as the cat claw polishing and filing tool 1 shown in FIG. 1. Among these embodiments of the cat claw polishing and filing tool 1, it is preferred that the filing sheet 2 is formed so as to be coplanar with the upper face of the cat claw polishing and filing tool 1, or that the filing sheet 2 is provided inside from the upper face of the cat claw polishing and filing tool 1, and it is more preferred that the filing sheet 2 is provided inside from the upper face of the cat claw polishing and filing tool 1, from the viewpoint efficient polishing and filing of a cat claw, and avoidance of imparting unpleasant feel to a cat.

In the cat claw polishing and filing tool 1 shown in FIG. 7, when the filing sheet 2 is projected from the upper face of the cat claw polishing and filing tool 1, the height of a projected filing sheet 2 from the upper face of the cat claw polishing and filing tool 1 is preferably 0 to 1 mm or so, and more preferably 0 to 0.5 mm or so, from the viewpoint efficient polishing and filing of a cat claw, and avoidance of imparting unpleasant feel to a cat.

In the cat claw polishing and filing tool 1 shown in FIG. 7, when the filing sheet 2 is present inside from the upper face of the cat claw polishing and filing tool 1, the depth from the upper face of the cat claw polishing and filing tool 1 to a position where the filing face of the filing sheet 2 is present is preferably 8 mm or less, more preferably 5 mm or less, and furthermore preferably 3 mm or less, from the viewpoint of efficient polishing and filing of a cat claw. In addition, the depth from the upper face of the cat claw polishing and filing tool 1 to the position where the filing face of the filing sheet 2 is present is preferably 1 mm or more, and more preferably 2 mm or more, from the viewpoint of inhibiting of excessive filing of a cat claw.

In the cat claw polishing and filing tool 1 shown in FIG. 7, since a space D is formed between the filing face of the filing sheet 2 and the side surface of the corrugated sheet 3, a claw of the cat's paw enters the space D, and the cat claw is abraded and filed with the filing face of the filing sheet 2 that is present in the space D. Therefore, the cat claw can be filed efficiently.

The size of the cat claw polishing and filing tool 1 is not particularly limited, and the size of the cat claw polishing and filing tool 1 can be appropriately adjusted in accordance with a place where the cat claw polishing and filing tool 1 is used, and the like. An embodiment of the cat claw polishing and filing tool 1 according to the present invention includes a cat claw polishing and filing tool having a cylindrical shape, in which a planar shape of the cat claw polishing and filing tool 1 is a circular shape having an outer diameter of 20 to 80 cm, and a thickness of the cat claw polishing and filing tool 1 is 1 to 10 cm or so. A space P is present in a center of the cat claw polishing and filing tool 1 shown in FIG. 7. A core material (not shown in the figure) can be inserted into the space P in order to fix the cat claw polishing and filing tool 1 to a substrate (not shown in the figure) as occasion demands.

As described above, the cat claw polishing and filing tool 1 according to the present invention utilizes a cat's behavior that a cat scratches an upper face of a corrugated board with its claw. Since the cat claw polishing and filing tool 1 according to the present invention has a filing sheet having a filing face for filing a cat claw on at least one side surface of the filing sheet, a corrugated sheet having a plurality of corrugated shapes on its side surface, and a linerboard, wherein an end face of the filing sheet, an end face having a corrugated shape of the corrugated sheet and an end face of the linerboard are formed on the upper face of the cat claw polishing and filing tool 1, wherein a space is formed between the filing face of the filing sheet and the side surface of the corrugated sheet, and wherein the space is communicated with the upper face of the cat claw polishing and filing tool, a claw tip of a cat is filed at the same time of polishing when a cat scratches the upper face of the cat claw polishing and filing tool 1. Accordingly, conventional complicated operations for cutting a cat claw with a claw clipper, which a cat dislikes can be eliminated by using the cat claw polishing and filing tool 1.

Accordingly, it is expected that the cat claw polishing and filing tool of the present invention can be used as a very useful tool for an owner raising a cat, cat lovers and the like.

EXAMPLES

Next, the present invention will be described more specifically on the basis of working examples, and the present invention is not limited only to those working examples.

Example 1

A cat claw polishing and filing tool 1 shown in the embodiment of FIG. 1 was produced. More specifically, a corrugated board having the corrugated sheet 3 of a B-flute corrugated board (type: BF) and the linerboard 4 was prepared as the corrugated board, to give a cat claw polishing and filing tool 1 having a rectangular parallelepiped shape having a longitudinal length of 50 cm, a lateral length of 12 cm and a height of 3 cm. In addition, as the filing sheet 2, a filing sheet having a length of 10.8 cm, a width of 2.8 cm and a thickness of about 2 mm, made by folding a waterproof sandpaper (granularity: #100) in two so that a filing face thereof was located outside, and bonding the inner faces of the filing sheet with each other with a double-sided adhesive tape manufactured by NITOMS INC., under the product number of T4010, was used. On an upper face of the cat claw polishing and filing tool 1, 18 notches (recesses) having a width of 11 cm and a depth of 3 cm were formed at an equidistance of 2.5 cm in a direction orthogonal to a longitudinal direction, and each of the filing sheets 2 was inserted in each notch so that a depth from the upper face of the cat claw polishing and filing tool 1 to the upper end of the filing sheet 2 was 2 mm. Since the filing sheet 2 was not provided on the lower face of the cat claw polishing and filing tool 1, an end face of the corrugated sheet 3 and an end face of the linerboard 4 are present on the lower face of the cat claw polishing and filing tool 1.

The cat claw polishing and filing tool 1 obtained in the above was fitted in a housing case, and thereafter the cat claw polishing and filing tool 1 was placed on a floor so that its upper face (polishing and filing face) faced upward. A domesticated cat was allowed to freely use the cat claw polishing and filing tool 1 for 5 days. The state of the claw tip of the cat front paw before and after the use of the cat claw polishing and filing tool 1 is shown in FIG. 8. It was confirmed that the claw tips 9 of a front paw of the cat were sharp as shown in FIG. 8(a) before the use of the cat claw polishing and filing tool 1, whereas the claw tips 9 of the front paw of the cat were filed as shown in FIG. 8(b) after the use of the cat claw polishing and filing tool 1.

In addition, after the cat was allowed to freely use the cat claw polishing and filing tool 1 for 5 days, a photograph substituted for a drawing of the upper face of the cat claw polishing and filing tool 1 is shown in FIG. 9, and a photograph substituted for a drawing of the claw of the cat front paw is shown in FIG. 10. As shown in FIG. 9, scratches made by a cat claw were found on the upper face of the cat claw polishing and filing tool 1. In addition, it can be seen that the claw tips of the cat front paw have been efficiently filed by using the cat claw polishing and filing tool 1 as shown in an area surrounded by a circle of FIG. 10.

After the cat claw polishing and filing tool 1 was used, the upper face (polishing and filing face) and a lower face (polishing face) of the cat claw polishing and filing tool 1 were reversed, and thereby the cat claw could be polished on the lower face (polishing face).

Example 2

The cat claw polishing and filing tool was produced in the same manner as in Example 1, except that a filing sheet having a length of 10.8 cm, a width of 2.8 cm and a thickness of about 0.5 mm, made by folding an abrasive cloth (granularity: #80) in two so that a filing face thereof was located outside, sandwiching a polypropylene sheet having a thickness of 0.15 mm between the inner faces of the folded abrasive cloth, and bonding the polypropylene sheet to the folded abrasive cloth, was used as the filing sheet.

The cat claw polishing and filing tool 1 obtained in the above was fitted in a housing case, and thereafter the cat claw polishing and filing tool was placed on a floor so that its upper face (polishing and filing face) faced upward in the same manner as in Example 1. A domesticated cat was allowed to freely use the cat claw polishing and filing tool for 5 days. As a result, it was confirmed that claw tips of the cat front paw were sharp as shown in FIG. 8(a) before the use of the cat claw polishing and filing, whereas the claw tips were filed as shown in FIG. 8(b) after the use of the cat claw polishing and filing tool, as well as Example 1. It can be seen from the above results that the claw tips of the cat front paw can be efficiently filed by using the cat claw polishing and filing tool.

In addition, after the cat claw polishing and filing tool was used, the upper face (polishing and filing face) and the lower face (polishing face) of the cat claw polishing and filing tool were reversed, and thereby the cat claws could be polished on the lower face (polishing face).

Example 3

The cat claw polishing and filing tool was produced in the same manner as in Example 1, except that a filing sheet having a length of 10.8 cm, a width of 2.8 cm and a thickness of about 0.5 mm, made by folding an abrasive cloth (granularity: #240) in two so that a filing face thereof was located outside, sandwiching a polypropylene sheet having a thickness of 0.15 mm between the inner faces of the folded abrasive cloth, and bonding the polypropylene sheet to the folded abrasive cloth, was used as the filing sheet.

The cat claw polishing and filing tool 1 obtained in the above was fitted in a housing case, and thereafter the cat claw polishing and filing tool was placed on a floor so that its upper face (polishing and filing face) faced upward in the same manner as in Example 1. A domesticated cat was allowed to freely use the cat claw polishing and filing tool for 5 days. As a result, it was confirmed that claw tips of the cat front paw were sharp as shown in FIG. 8(a) before the use of the cat claw polishing and filing, whereas the claw tips were filed as shown in FIG. 8(b) after the use of the cat claw polishing and filing tool, as well as Example 1. It can be seen from the above results that the claw tips of the cat front paw can be efficiently filed by using the cat claw polishing and filing tool.

In addition, after the cat claw polishing and filing tool was used, the upper face (polishing and filing face) and the lower face (polishing face) of the cat claw polishing and filing tool were reversed, and thereby the cat claws could be polished on the lower face (polishing face).

Example 4

The cat claw polishing and filing tool 1 of the embodiment shown in FIG. 1 was produced. More specifically, a corrugated board having the corrugated sheet 3 of a B-flute corrugated board (type: BF) and the linerboard 4 was prepared as the corrugated board, and a waterproof sandpaper (granularity: #100) was used as the filing sheet 2.

One side surface of the double-sided adhesive tape manufactured by NITOMS, INC under the product number of T4010 was adhered to a back side surface of the waterproof sandpaper, and thereafter a release paper of the double-sided adhesive tape was removed therefrom to expose an adhesive face of the double-sided adhesive tape.

The corrugated board was adhered to the adhesive face of the waterproof sandpaper. The filing face of the waterproof sandpaper was contacted with the corrugated sheet 3 of the corrugated board adjacent to the filing face. The filing sheet 2 and the corrugated board adjacent to the filing face were positioned in an area from the middle to the upper end of the cat claw polishing and filing tool 1 in the direction of a paper surface of FIG. 1 so that the filing face of the waterproof sandpaper faced upward on a paper surface of FIG. 1, and the depth from the upper face of the cat claw polishing and filing tool 1 to the upper end of the waterproof sandpaper was adjusted to 2 mm. In addition, the corrugated board was adhered to the adhesive face of the waterproof sandpaper.

The filing face of the waterproof sandpaper was contacted with the corrugated sheet 3 of the corrugated board adjacent to the filing face. The filing sheet 2 and the corrugated board adjacent to the filing face were positioned in an area from the middle to the lower end of the cat claw polishing and filing tool 1 in the direction of a paper surface of FIG. 1 so that the filing face of the waterproof sandpaper faced downward on a paper surface of FIG. 1, and the depth from the lower face of the cat claw polishing and filing tool 1 to the lower end of the waterproof sandpaper was adjusted to 2 mm.

The corrugated boards were placed in the cat claw polishing and filing tool 1 so that the waterproof sandpaper was positioned in an equidistance of 2.5 cm in a direction orthogonal to a longitudinal direction of the upper face of the cat claw polishing and filing tool 1, to give the cat claw polishing and filing tool 1 having a rectangular parallelepiped shape having a longitudinal length of 50 cm, a lateral length of 12 cm and a height of 3 cm. Since the filing sheet 2 was not provided on the lower face of the cat claw polishing and filing tool 1, the end face of the corrugated sheet 3 and the end face of the linerboard 4 are present on the lower face of the cat claw polishing and filing tool 1.

Next, the cat claw polishing and filing tool 1 obtained in the above was fitted in a housing case, and thereafter placed on a floor so that an upper face (polishing and filing face) thereof was faced up. A domesticated cat was allowed to freely use the cat claw polishing and filing tool 1 for 5 days. As a result, claw tips of the front paw of the cat were sharp as shown in FIG. 8(a) before the use of the cat claw polishing and filing tool 1, whereas the claw tips were filed as shown in FIG. 8(b) after the use of the cat claw polishing and filing tool 1, as well as Example 1. It can be seen from the above results that the claw tip of the front paw of the cat is efficiently filed by using the cat claw polishing and filing tool 1.

In addition, after the cat claw polishing and filing tool 1 was used, an upper face (polishing and filing face) and a lower face (polishing face) of the cat claw polishing and filing tool 1 were reversed, thereby the cat claw could be polished on the lower face (polishing face).

Example 5

The cat claw polishing and filing tool 1 of the embodiment shown in FIG. 5 was produced. More specifically, a single-sided corrugated board having the corrugated sheet 3 of a B-flute corrugated board (type: BF) and the linerboard 4 as a corrugated board was prepared. The corrugated sheet 3, the linerboard 4 and the filing sheet 2 were arranged so as to be parallel, and both sides of the filing sheet 2 were contacted with the corrugated sheets 3 of the single-sided corrugated board, to give a cat claw polishing and filing tool 1 having a shape of a rectangular parallelepiped having a longitudinal length of 50 cm, a lateral length of 12 cm and a height of 3 cm.

Incidentally, a filing sheet having a length of 10.8 cm, a width of 2.8 cm and a thickness of about 2 mm was produced by folding a waterproof sandpaper (granularity: #100) in two so that a filing face was located outside, and adhering the inner surfaces of the folded waterproof sandpaper with a double-sided adhesive tape manufactured by NITOMS, INC under the product number of T4010, and the filing sheet was used as the filing sheet 2. The depth from an upper face of the cat claw polishing and filing tool 1 to an upper end of the filing sheet 2 was adjusted so as to be 2 mm, and the filing sheet 2 was arranged in the cat claw polishing and filing tool 1 in an equidistance of 2.5 cm in a direction orthogonal to a longitudinal direction of the cat claw polishing and filing tool 1.

The cat claw polishing and filing tool 1 obtained in the above was fitted in a housing case, and thereafter placed on a floor so that an upper face (polishing and filing face) thereof was faced up. A domesticated cat was allowed to freely use the cat claw polishing and filing tool 1 for 5 days. As a result, claw tips of the front paw of the cat were sharp as shown in FIG. 8(a) before the use of the cat claw polishing and filing tool 1, whereas the claw tips were filed as shown in FIG. 8(b) after the use of the cat claw polishing and filing tool 1. It can be seen from the above results that the claw tip of the front paw of the cat is efficiently filed by using the cat claw polishing and filing tool 1.

In addition, after the cat claw polishing and filing tool 1 was used, an upper face (polishing and filing face) and a lower face (polishing face) of the cat claw polishing and filing tool 1 were reversed, and thereby the cat claw could be polished on the lower face (polishing face).

Example 6

The cat claw polishing and filing tool was produced in the same manner as in Example 5, except that a filing sheet having a length of 10.8 cm, a width of 2.8 cm and a thickness of about 0.5 mm, made by folding an abrasive cloth (granularity: #180) in two so that a filing face thereof was located outside, sandwiching a polypropylene sheet having a thickness of 0.15 mm between the inner faces of the folded abrasive cloth, and bonding the polypropylene sheet to the folded abrasive cloth, was used as the filing sheet.

The cat claw polishing and filing tool 1 obtained in the above was fitted in a housing case, and thereafter the cat claw polishing and filing tool was placed on a floor so that its upper face (polishing and filing face) faced upward in the same manner as in Example 5. A domesticated cat was allowed to freely use the cat claw polishing and filing tool for 5 days. As a result, it was confirmed that claw tips of the cat front paw were sharp as shown in FIG. 8(a) before the use of the cat claw polishing and filing, whereas the claw tips were filed as shown in FIG. 8(b) after the use of the cat claw polishing and filing tool, as well as Example 1. It can be seen from the above results that the claw tips of the cat front paw can be efficiently filed by using the cat claw polishing and filing tool.

In addition, after the cat claw polishing and filing tool was used, the upper face (polishing and filing face) and the lower face (polishing face) of the cat claw polishing and filing tool were reversed, and thereby the cat claws could be polished on the lower face (polishing face).

Example 7

The cat claw polishing and filing tool 1 of the embodiment shown in FIG. 7 was produced. More specifically, a single-sided corrugated board having the corrugated sheet 3 of a B-flute corrugated board (type: BF) and the linerboard 4 was prepared as a corrugated board. The corrugated board was wound around in a circular shape so that both sides of the filing sheet 2 were contacted with the corrugated sheet 3 of the single-sided corrugated board, to give a cylindrical cat claw polishing and filing tool 1 having a planar shape of a diameter of 30 cm and a height of 3 cm.

Incidentally, a filing sheet having a length of 10.8 cm, a width of 2.8 cm and a thickness of about 2 mm was produced by folding a waterproof sandpaper (granularity: #100) in two so that a filing face was located outside, and adhering the inner surfaces of the folded waterproof sandpaper with a double-sided adhesive tape manufactured by NITOMS, INC under the product number of T4010. The filing sheet was used as the filing sheet 2. The depth from an upper face of the cat claw polishing and filing tool 1 to an upper end of the filing sheet 2 was adjusted so as to be 2 mm, and the filing sheet 2 was placed in the cat claw polishing and filing tool 1 in an equidistance of 2.5 cm in a direction orthogonal to a longitudinal direction of the cat claw polishing and filing tool 1.

The cat claw polishing and filing tool 1 obtained in the above was fitted in a housing case, and thereafter placed on a floor so that an upper face (polishing and filing face) thereof was faced up. A domesticated cat was allowed to freely use the cat claw polishing and filing tool 1 for 5 days. As a result, the claws tip of the front paw of the cat were sharp as shown in FIG. 8(a) before the use of the cat claw polishing and filing tool 1, whereas the claw tips were filed as shown in FIG. 8(b) after the use of the cat claw polishing and filing tool 1. It can be seen from the above results that the claw tip of the front paw of the cat is efficiently filed by using the cat claw polishing and filing tool 1.

In addition, after the cat claw polishing and filing tool was used, the upper face (polishing and filing face) and the lower face (polishing face) of the cat claw polishing and filing tool were reversed, and thereby the cat claws could be polished on the lower face (polishing face).

From the results mentioned above, it can be seen that excellent effects such that a claw tip of a cat can be efficiently filed and polished at the same time are exhibited by using the cat claw polishing and filing tool according to the present invention without the use of a claw clipper and the like.

EXPLANATION OF NUMERAL 1 cat claw polishing and filing tool
2, 2' filing sheet
2a filing face of filing sheet
2b side surface of filing sheet
2c end face of filing sheet
3 corrugated sheet
3a side surface of corrugated sheet
3b end face of corrugated sheet
4 linerboard
4a end surface of linerboard
5, 5a laminated corrugated board
6 housing case
7 mounting flange
8 fixing member
9 claw tip of front paw of cat
S space
G space

The invention claimed is:

1. A cat claw polishing and filing tool, comprising:
   (i) a filing sheet having a filing face for filing a cat claw on a side surface of the filing sheet;
   (ii) a plurality of corrugated sheets having a plurality of corrugated shapes on a side surface of the corrugated sheets; and
   (iii) linerboards,
   wherein the cat claw polishing and filing tool has an end face of the filing sheet, an end face having the corrugated shapes of the corrugated sheets and an end face of the linerboard, that are formed on the upper face of the cat claw polishing and filing tool;

wherein a plurality of the linerboards are alternately laminated with a plurality of the corrugated sheets;

wherein the filing sheet comprises a two-fold filing sheet in which a substrate having elasticity is sandwiched between inner surfaces of the filing sheet;

wherein the filing sheet having the filing face is provided in a direction orthogonal to the corrugated sheet and the liner board;

wherein a space is formed by the filing sheet, the corrugated sheet, and the linerboard;

wherein the space is surrounded by the filing sheet, the corrugated sheet and the linerboard; wherein the space communicates with the upper face of the cat claw polishing and filing tool; and wherein the filing face of the filing sheet is directly contacted with the space surrounded by (a) the filing sheet provided in a direction orthogonal to the corrugated sheet and the liner board, (b) the corrugated sheet and (c) the linerboard.

2. The cat claw polishing and filing tool of claim 1, wherein the filing sheet comprises a sandpaper.

\* \* \* \* \*